(12) United States Patent
Yang

(10) Patent No.: US 6,561,730 B2
(45) Date of Patent: May 13, 2003

(54) COVERING BLOCK FOR DECREASING WAVE FORCES

(76) Inventor: Won-Hoi Yang, Ma-1106, Samho-Apt. 725, Bangbae-dong, Seocho-gu, Seoul (KR)

( * ) Notice: Subject to any disclaimer, the term of this patent is extended or adjusted under 35 U.S.C. 154(b) by 0 days.

(21) Appl. No.: 09/918,389

(22) Filed: Jul. 30, 2001

(65) Prior Publication Data

US 2002/0031401 A1 Mar. 14, 2002

(30) Foreign Application Priority Data

Aug. 21, 2000 (KR) ........................................ 2000-23605

(51) Int. Cl.⁷ ................................................. E02B 3/06
(52) U.S. Cl. .............................. 405/33; 405/30; 405/21; 405/16
(58) Field of Search .............................. 405/30, 33–35, 405/15, 16, 21, 25, 17, 73, 74, 80

(56) References Cited

U.S. PATENT DOCUMENTS 4,154,548 A * 5/1979 Ijima ........................... 405/30
4,175,888 A * 11/1979 Ijima ........................ 405/33 X
4,413,924 A * 11/1983 Ijima ........................ 405/33 X
5,697,736 A * 12/1997 Veazey et al. ............ 405/21 X
6,361,247 B1 * 3/2002 Detiveaux .................... 405/21

FOREIGN PATENT DOCUMENTS

| JP | 2269215 | * 11/1990 |
| JP | 925638 | * 1/1997 |
| JP | 317028 | * 11/2001 |
| JP | 317029 | * 11/2001 |
| JP | 336133 | * 12/2001 |

* cited by examiner

Primary Examiner—Thomas B. Will
Assistant Examiner—Sunil Singh
(74) Attorney, Agent, or Firm—Howard & Howard

(57) ABSTRACT

A block for constructing a breakwater comprises a front wall in which horizontal projections are formed with transverse rectangular-shaped holes therebetween. Side walls extend from both ends of the front wall. A partition wall in which multiple holes are formed to communicate with the transverse rectangular-shaped holes is jointed to the side walls at both ends and spaced from the front wall. A detention area is defined by the front wall, partition wall and side walls for receiving the overflow waves through the transverse rectangular-shaped holes in the front wall.

5 Claims, 4 Drawing Sheets

COVERING BLOCK FOR DECREASING WAVE FORCES

This application claims priority to Korean Patent Application No. 2000-23605 filed Aug. 21, 2000.

FIELD OF THE INVENTION

This invention relates to blocks to be assembled and used for constructing a breakwater that can decrease wave forces effectively.

BACKGROUND OF INVENTION

In the prior art, rubble mounds are used on inclined surfaces of a breakwater. Strong or impulse waves and tides easily remove these rubble mounds.

Korean patent application No. 1999-46541 and Korean utility model application No. 1999-21409, filed in the name of the same inventor, show blocks for constructing a breakwater having horizontal holes smaller in size than rubble in the mound. The blocks include a large number of holes. The large number of holes prevents loss of rubble from the mounds. The large number of holes effectively decreases the power of waves between projections in the blocks, particularly for overriding large waves that hinder the serenity of the inner sea.

Most of the conventional blocks, however, are ineffective for dissipating and relieving wave forces. Further, they are too large to be conveniently installed.

SUMMARY OF THE INVENTION

The present block defines rectangular shaped, horizontal holes arranged in multiple rows, and projections horizontally arranged with the holes therebetween in a front wall for the purpose of lapping, dispersing, and diffracting waves to decrease the wave power.

The present block also includes first and second side walls, which are perpendicular to the front wall facing the sea. A partition wall is arranged between the side walls. The partition wall is perpendicular and joined thereto, and further is parallel to the front wall. An intermediate wall is formed on the rear side of the partition wall and projects backward therefrom in a vertical manner. The intermediate wall forms spaces with the side walls, in which, rubble mounds are buried behind the breakwater.

Therefore, it is an object of the present invention to provide such blocks that solve these problems in view of the stability and ease of installing the blocks to construct the breakwater.

It is an another object of the present invention to make the blocks to effectively decrease wave forces, by incorporating the projections on the front wall of the breakwater and the holes formed therebetween. The block further includes the side walls joined to the front wall on both sides. The vertical partition wall is formed between the side walls and forms the web of an "H" shape. These four walls form a detention area at the rear of the front wall, which receives overflow waves. At the rear part of the partition wall, there are open rear cavities filled with stones and rubble that form the mounds to absorb wave water.

DETAILED DESCRIPTION OF THE PRESENT INVENTION

Figure 1:
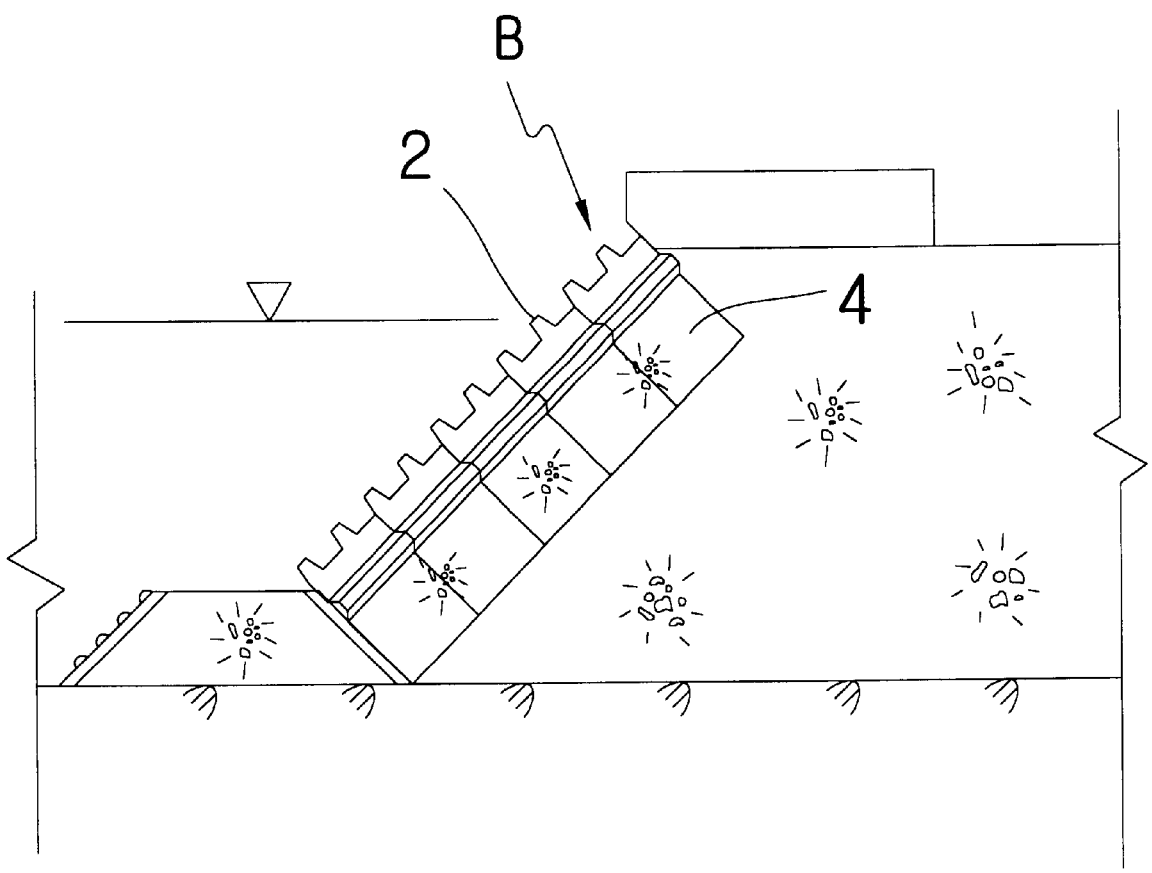
FIG. 1 is a cross sectional view of a breakwater of the present invention.
Figure 2:
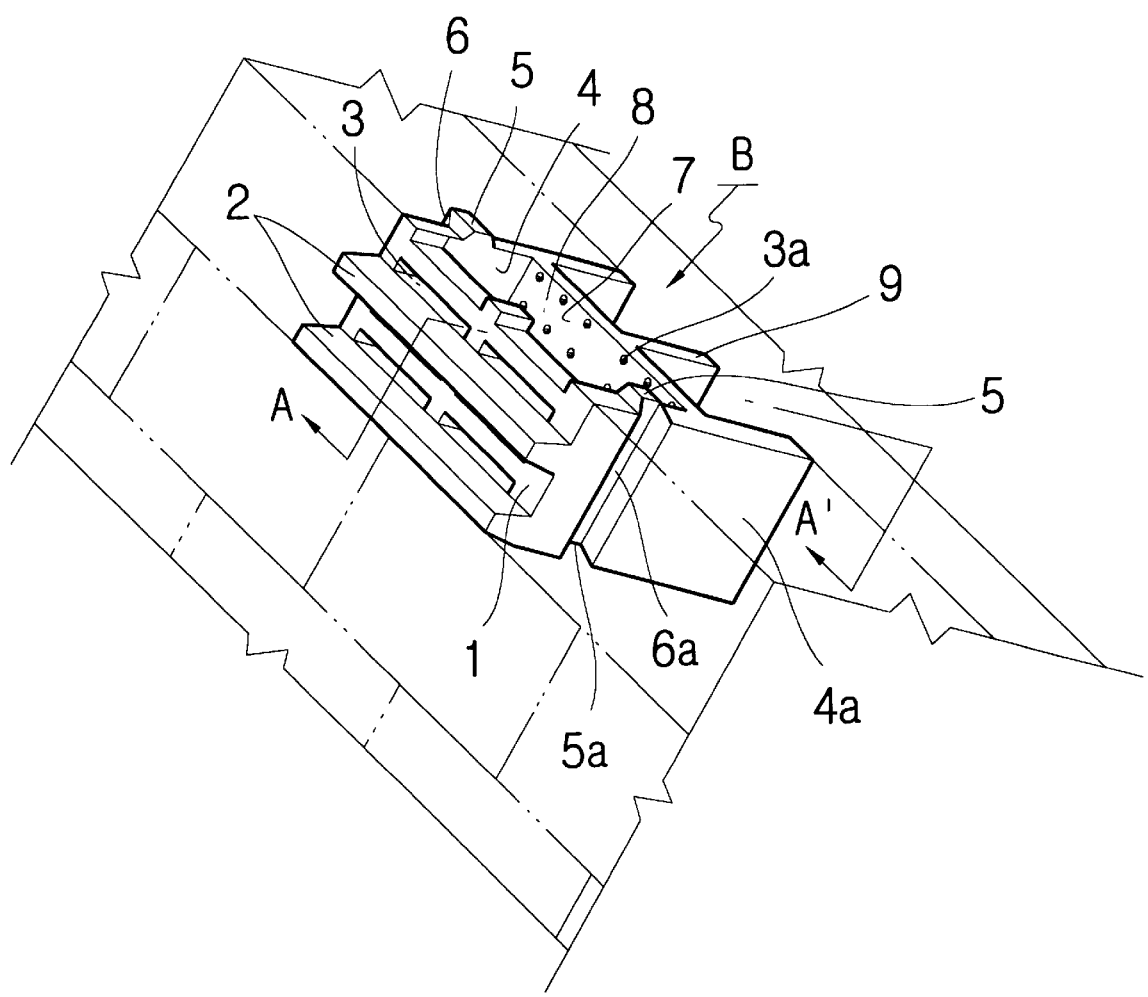
FIG. 2 is a perspective view of a block embodying the present invention.

The blocks B of the present invention, which are to be installed on a breakwater as in FIG. 1, are usually set up and assembled one to another by cranes in a step by step manner, and finally arranged and fixed to the breakwater.

The construction of the blocks B, is hereinafter disclosed.

In the drawings, each block B of the present invention, comprises a front wall 1 on which are formed horizontal projections 2 that are disposed facing the sea. The front wall 1 also defines transversal holes 3 through which waves can pass through the front wall. Side walls 4, 4a are joined perpendicular to the front wall 1, at both sides thereof, and to a partition wall 7 which is integral with the side walls 4, 4a at both ends. An intermediate wall 9 extends rearward from a center portion of the partition wall 7. The side walls 4, 4a form upper protrusions 5 and lower recesses 5a on the upper and lower part thereof, and also form a side protrusion 6 vertically out of one side wall and a side recess 6a in the opposite side wall, for fitting one another in the breakwater.

The front wall 1, side walls 4, 4a and partition wall 7 form a detention area 8 therein which is opened upwardly. The detention area receives rushed sea water which may be passed into the holes 3 and through the front wall 1. In the central portion of the partition wall 7, multiple holes 3a are formed for passing the sea water therethrough for absorbing the water in material, such as stones and pebbles, retained behind the partition wall 7. The holes 3a also communicate with the holes 3 in the front wall 1, for passing through and absorbing sea water into the stones and pebbles behind partition wall 7 and out of the detention area 8, and vice versa. The holes 3a in the partition wall 7 are smaller than those of the pebbles and stones for preventing loss thereof.

Meanwhile, an intermediate wall 9, of which the width and height are the same as those of the side walls 4, 4a, is vertically projected to the rear from the partition wall 7. The intermediate wall 9 aids in supporting the partition wall 7 by filling the stones and pebbles in open rear cavities behind the partition wall 7 formed between the side walls 4, 4a and the intermediate wall 9.

Figure 3:
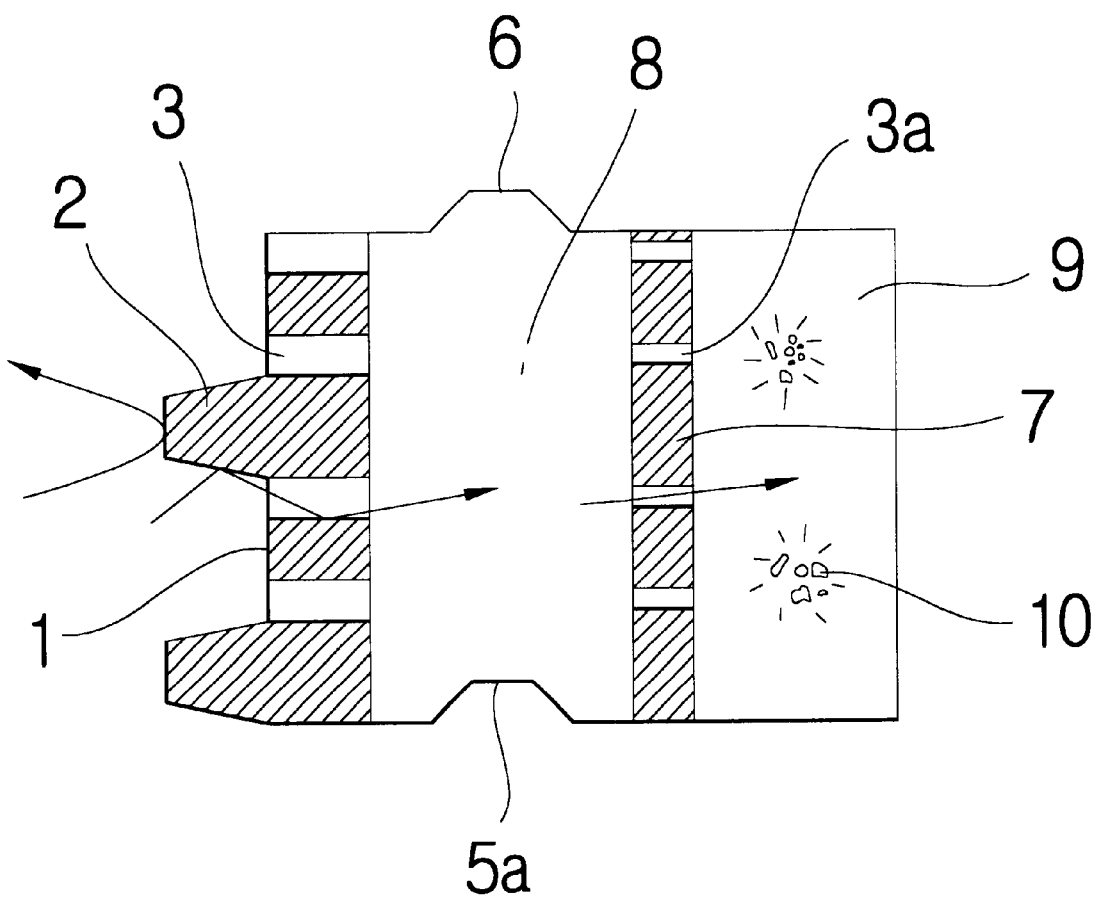
FIG. 3 is a longitudinal cross sectional view taken along the A–A' of FIG. 2.
Figure 4:
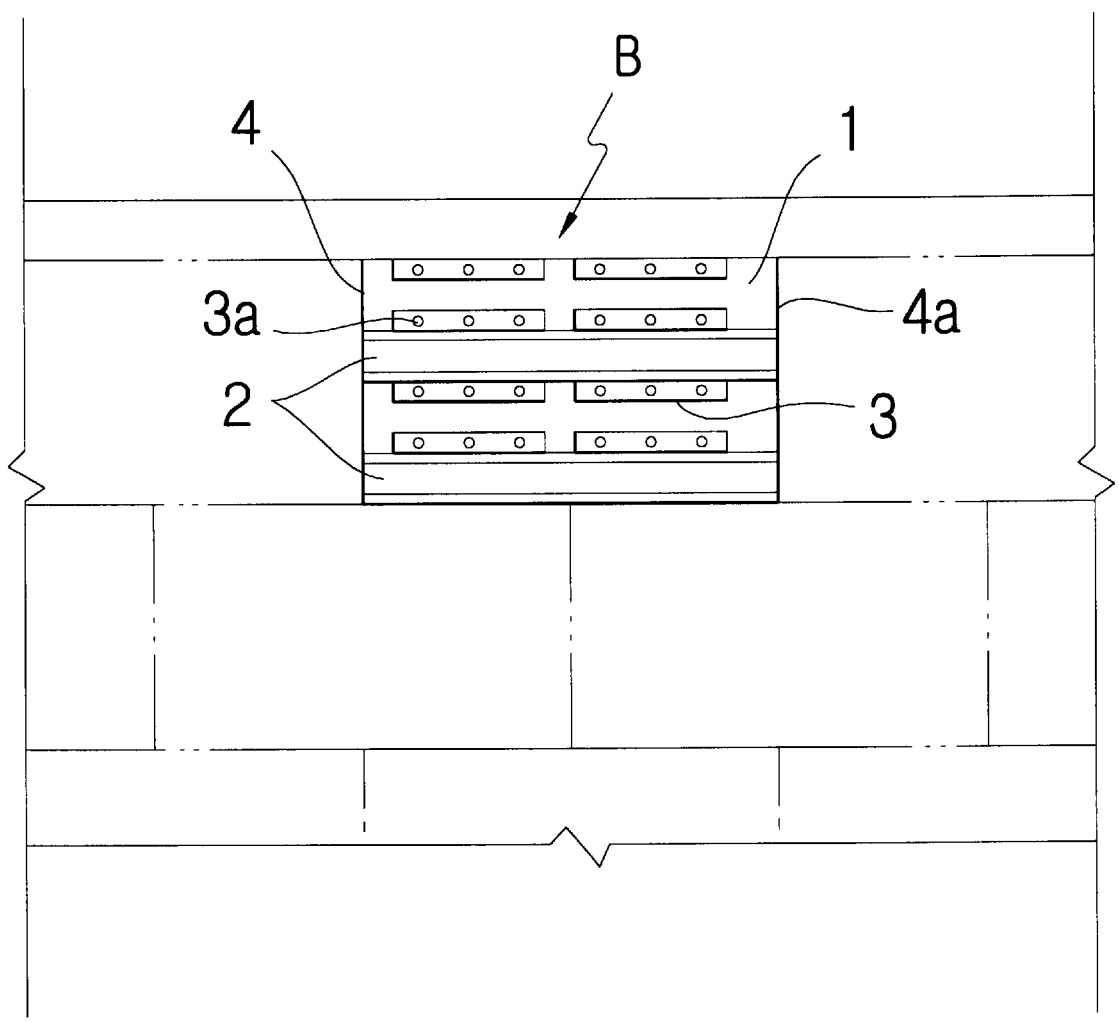
FIG. 4 is a front view of the block of the breakwater embodying the present invention.

The stones and pebbles are stacked in the open rear cavities, as seen in FIG. 3. The stones and pebbles, or a rubble mound 10, absorb the waters introduced through the holes 3a, and also emit absorbed waters through the holes 3a. The holes 3a and holes 3 fluidly communicate with each other, when the tide ebbs.

According to the present invention, the blocks B decrease wave powers by having sufficiently wide spaces formed between the horizontal projections 2 in the front wall 1 to promote reflection and diffraction of the waves. The detention area 8 contributes to decreasing wave powers by communicating with the rectangular-shaped holes 3. Further, the holes 3a absorb waters introduced therethrough and overflow the water into stones comprising rubble mounds 10 stacked in the open rear cavities defined between the side walls 4, 4a and intermediate wall 9.

The length of the projections 2 having long tip portions contributes to the dissipation of the waves for decreasing wave power. Such wave dissipation results in a longer life of the blocks B of the breakwater, as well as providing effective and convenient means to stack and handle the desired wall structure.

A breakwater wall comprised of the blocks B including the holes 3 in the front wall 1 and the holes 3a in the partition wall 7 further prevents waves from sweeping out rubble 10.

The detention area 8 reduces the water turbulence, and therefore the size of the holes 3a can be formed as smaller ones than in the present invention.

I claim:

1. A block for constructing a breakwater to reduce erosion of a shoreline, said block comprising:

a front wall having a first end and a second end and further defining a plurality of holes therethrough;

a first side wall extending rearwardly from said first end;

a second side wall extending rearwardly from said second end and substantially parallel to said first side wall;

a partition wall intermediately extending between said first and said second side walls and defining a plurality of holes therethrough, said partition wall being substantially parallel to said front wall; the partition wall and a portion of said first and said second sidewalls define an open rear cavity;

a plurality of horizontal projections extending from said front wall wherein at least a portion of said plurality of holes are located between two of said plurality of horizontal projections and wherein each of said plurality of holes are rectangular and horizontally oriented;

an intermediate wall extending rearward from said partition wall and parallel to said side walls; and at least one side protrusion on said first side wall and at least one side recess in said second side wall, said side protrusion and said side recess positioned such that said side protrusion of said block is aligned with a side recess in a like block adjacently placed next to said block.

2. The block according to claim 1 further including at least one top protrusion on a top surface of said block and at least one bottom recess in a bottom surface of said block, said top protrusion and said bottom recess positioned such that said top protrusion of said block is aligned with a bottom recess of a like block stacked on said block.

3. A block for constructing a breakwater to reduce erosion of a shoreline, said block comprising:

a front wall having a first end and a second end and defining a plurality of holes therethrough wherein said plurality of holes are in a rectangular shape;

a first side wall perpendicularly and rearwardly extending from said first end and having at least one upper protrusion extending therefrom, one side protrusion extending therefrom, and one lower recess defined therein for mating with adjacent blocks;

a second side wall parallel to and spaced from said first side wall and perpendicularly and rearwardly extending from said second end, said second side wall having at least one upper protrusion extending therefrom, one side recess defined therein, and one lower recess defined therein for mating with adjacent blocks;

a partition wall intermediately and perpendicularly extending between said first and said second side walls and having a central portion, said partition wall being spaced from and parallel to said front wall;

a plurality of projections protruding forwardly and horizontally from said front wall wherein said plurality of holes in said front wall are transversally defined in rows between said plurality of projections;

an intermediate wall rearwardly and perpendicularly extending from said central portion of said partition wall;

said front wall, side walls, and partition wall defining a detention area for receiving dissipated waves entering through said plurality of holes; and said partition wall, side walls, and intermediate wall defining at least a portion of an open rear cavity wherein said portion of said open rear cavity is in fluid communication with said detention area.

4. A block for constructing a breakwater according to claim 3 wherein said partition wall defines a plurality of holes in fluid communication with said plurality of holes defined in said front wall for receiving sea water.

5. A block for constructing a breakwater according to claim 3 wherein said plurality of projections of said front wall each have a tip portion and a base portion wherein said tip portion is narrower than said base portion for dissipating wave energy.

* * * * *